Feb. 6, 1962  G. COZZO ET AL  3,019,669
REVERSING DRIVE AND CONTROL
Filed Feb. 24, 1958  2 Sheets-Sheet 1

INVENTORS
GIUSEPPE COZZO
ROY D. PALMER
BY
Pollard Johnston Suythe Robertson
ATTORNEYS INVENTORS
GIUSEPPE COZZO
ROY D. PALMER
BY
Pollard Johnston Smyth & Robertson
ATTORNEYS

# United States Patent Office 3,019,669
Patented Feb. 6, 1962

3,019,669
REVERSING DRIVE AND CONTROL
Giuseppe Cozzo, Yonkers, and Roy D. Palmer, New York, N.Y., assignors to Baldwin-Lima-Hamilton Corporation, Philadelphia, Pa., a corporation of Pennsylvania
Filed Feb. 24, 1958, Ser. No. 717,213
12 Claims. (Cl. 74—661)

The present invention relates to drives for rolling mills and the like, and particularly to a new and improved reversing drive for such mills.

A reversing rolling mill requires maximum power to operate it during the working portion of each pass in each direction, but only a comparatively small amount during the idle or non-working part of the pass. Such a mill when intended for very high production is usually driven by a direct current reversing motor which obtains its power from an associated motor-generator. Such an electrical installation is, however, very expensive and is economically unjustified when the required production cannot keep it sufficiently occupied.

Reversing mills are sometimes driven by reversing alternating current motors. Such motors require a considerable time for reversal from full speed in one direction to full speed in the other direction and there is a considerable power loss during each reversal.

Reversing mills are also sometimes driven by direct current reversing motors which obtain their power from a direct current line supply. In these motors, too, there is a considerable loss of power during each reversal.

Either an alternating current or direct current driving motor running continuously in one direction would be lower in installed cost and operating cost than a reversing motor of comparable size with its associated equipment.

The principal object of the invention is to provide a reversing drive for a reversing rolling mill or the like, the initial and operation costs of which are relatively low.

Another object of the invention is to drive a reversing rolling mill or the like chiefly by means of a motor which rotates continuously in one direction during operation.

A further object of the invention is to provide a control for disengaging a continuously running main motor from a reversible rolling mill upon completion of the working pass in one direction, reversing the mill while it is idle and disengaged from the main motor, bringing the mill up to operating speed in the reverse direction, and then connecting the main motor through a reversing gear with the mill for the reverse working pass.

According to one aspect of the invention, the mill is reversed and brought up to operating speed by a comparatively small reversible motor while the main driving motor is disengaged from the mill. The main drive may comprise an alternating current motor such as a synchronous motor, while the auxiliary drive may comprise a direct current motor or an alternating current wound rotor type motor. This auxiliary motor need only be large enough to bring the idle mill up to operating speed both in the forward and reverse directions. The main motor and the auxiliary motor may jointly drive the mill while they are both connected thereto.

Two clutches may be provided for connecting the main driving motor to the mill. One of the clutches, when engaged, will cause the mill to rotate in one direction, and the other, when engaged, will cause the mill to rotate in the opposite direction.

The above, other objects and novel features of the invention will become apparent from the following specification and accompanying drawings, which are merely exemplary.

Figure 1:
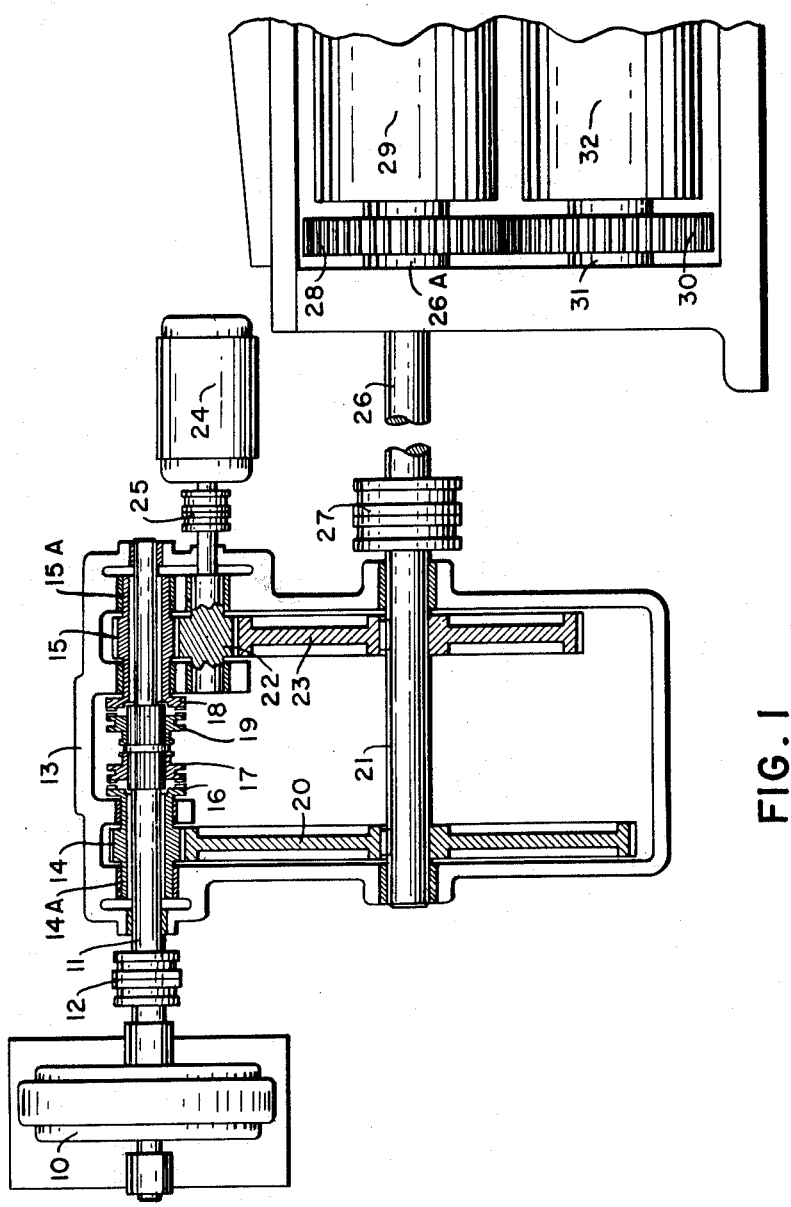
FIGURE 1 is a top plan view (partly in section) of a reversing rolling mill (shown in elevation) to which the principles of the invention have been applied.

Referring to FIG. 1, a main driving motor 10 may be a synchronous alternating current motor, of sufficient power to satisfy the greater part of the demands of the mill to which the drive is applied, and may be directly connected to a shaft 11 by a coupling 12. The shaft 11 may extend through a split housing 13, a portion of the lower half of which is shown in FIG. 1, and coaxially through hollow shafts 14A and 15A integral with gears 14 and 15, respectively, the shafts 14A, 15A being journaled in housing 13. The shaft 14A may include one element 16 of a positive engaging clutch, the other element 17 of which may be slidably splined to shaft 11. The shaft 15A may include one element 18 of a positive engaging clutch, the other element 19 of which may be likewise slidably splined to shaft 11.

Gear 14 may mesh with a gear 20 keyed to a shaft 21 which extends through housing 13 and which may be parallel to shaft 11. Gear 15 may mesh with an intermediate gear 22 which in turn may mesh with gear 23 which is likewise keyed to shaft 21, the latter gear train providing a reversing drive from shaft 11 to shaft 21. The ratio between gears 14 and 20 and the ratio between gears 15 and 23 are the same if the rates of rotation of shaft 21 in both a forward and reverse direction are to be the same. A reversible direct current motor 24 may be directly connected to intermediate gear 22 through a coupling 25. The shaft 21 may be connected to the input shaft 26 of a reversing rolling mill through a coupling 27. The shaft 26 may rotate a shaft 26A which carries a fixed gear 28 and drives a roll 29; while gear 28 may mesh with a gear 30 that is fixed to a shaft 31 parallel to shaft 26A and driving a roll 32 that cooperates with the roll 29 to produce the desired rolling operation on work.

As previously indicated, the power delivered by motor 24 may supplement that delivered by main driving motor 10 during each forward and rearward working pass. It also is capable of decelerating the idle mill, stopping it, reversing the direction of the rolls 29 and 32, and accelerating their speed to normal working speed. This may be accomplished by employing the control shown in FIGS. 2 and 3.

Figures 2, 3:
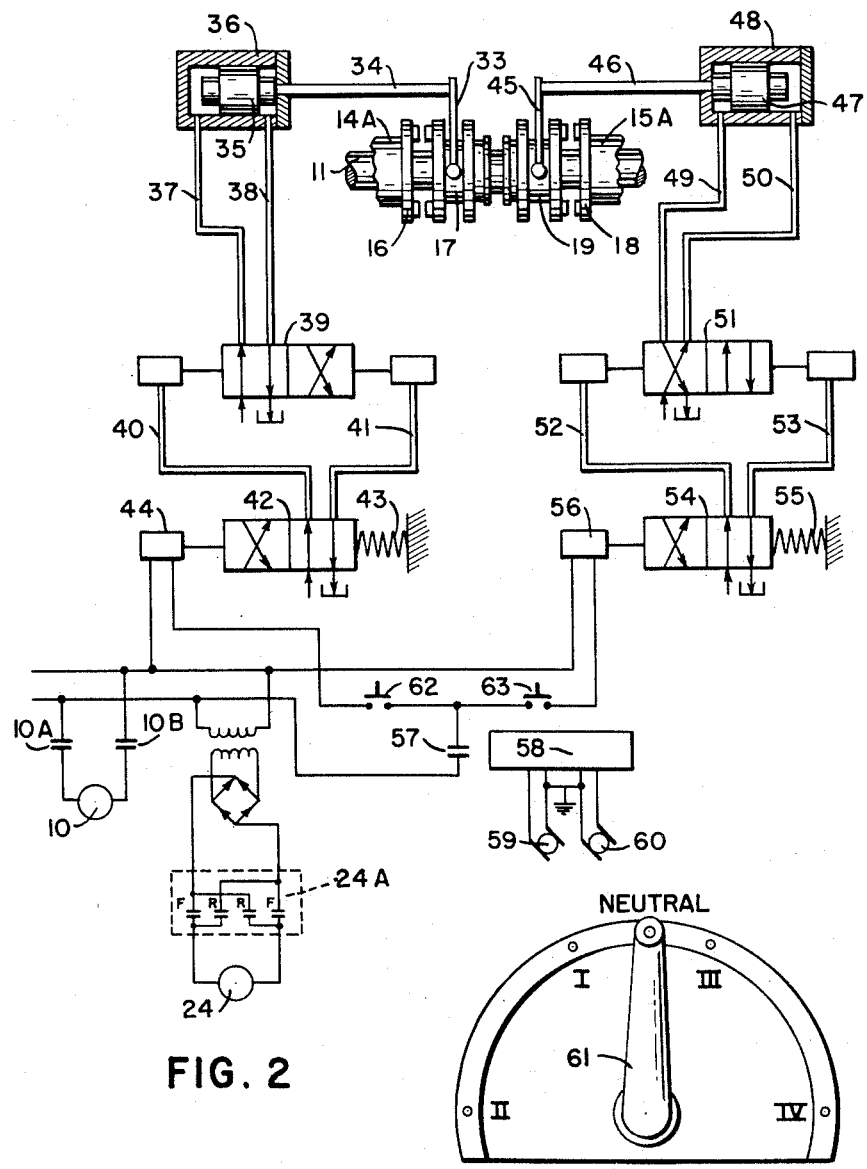
FIG. 2 is a schematic diagram of a control for the reversing drive shown in FIG. 1.
FIG. 3 is a control handle for operating the control of FIG. 2.

Referring to FIG. 2, clutch element 17 may be provided with a shifting fork 33 that may be connected to a piston rod 34 of a piston 35 that is adapted to be reciprocated within a cylinder 36. Fluid lines 37 and 38 may extend between the cylinder 36 and a conventional four-way valve 39 that may be fluid operated. Additionally, lines 40, 41 may extend from the operators of valve 39 to a conventional four-way pilot valve 42 that may be urged in one direction by a spring 43 and actuated in the other direction by the energization of a solenoid 44.

The clutch element 19 may be actuated by a fork 45 that is connected to a piston rod 46 of a piston 47 adapted to be reciprocated within a cylinder 48. Lines 49 and 50 may connect opposite sides of cylinder 48 to a four-way valve 51 that may be fluid operated. Lines 52 and 53 may be connected from the operators of valve 51 to another four-way pilot valve 54 that may be moved in one direction by a spring 55, and in the opposite direction by the energization of a solenoid 56.

The solenoids 44 and 56 may be connected into an electrical circuit including controlled contacts 57 which are elements of an automatic synchronizer 58. The automatic synchronizing system may include small single-phase synchronous generators 59 and 60 having identical characteristics. The generator 59 may be driven from shaft 11, while generator 60 may be driven from motor 24 in a manner such that the generators 59, 60 are synchronized when the numbers of revolutions per minute of both motors 10 and 24 are adapted for driving the shaft 21 at the same speed, that is, when the motors are in effective synchronism. The automatic synchronizer is a standard commercial item which may be arranged so that when both generators 59 and 60 are in synchronism, contacts 57 automatically close; and, when generators 59 and 60 are out of synchronization, contacts 57 automatically open.

Referring to FIG. 3, a control handle or lever 61 may be connected to cam means (not shown) for causing the closing and opening of certain of the contacts within the diagram of FIG. 2.

To start the operation, first of all contacts 10A and 10B (FIG. 2) are closed manually and independently, which will cause alternating current motor 10 to rotate at its rated speed. Lever 61 is then moved from the neutral position shown to its number I position and the cam means associated with the lever may be employed to close contacts 62 to set the clutch control circuit for forward operation, and to close contacts F—F as required for forward rotation of the direct current motor 24. Thus, motor 24 will slowly start to drive shaft 21 in the same direction in which motor 10 will drive it when the forward clutch 16—17 is engaged, a control arrangement shown schematically in box 24A being in the position for low speed.

Continued motion of lever 61 and its cam means to position II serves to adjust the control box 24A and thereby increase the speed of direct current motor 24 to an extent such that the motor 24 drives shaft 21 at the same speed at which the motor 10 will drive it when clutch 16—17 is engaged. Thus, at this instant, the rolls 29 and 32 are idling at operating speed in the direction required for producing the next forward working pass. As soon as the operating speed of motor 24 has been reached, however, both generators 59 and 60 are in synchronism, causing synchronizer 58 to close contacts 57. Accordingly, solenoid 44 is energized through the previously closed switch 62, while solenoid 56 remains de-energized since switch 63 is open at this time.

Energizing solenoid 44 forces valve 42 rightwardly against spring 43, causing pressure fluid to flow through line 41 while exhausting line 40. This shifts valve 39 leftwardly so that pressure fluid flows through line 38 while line 37 is connected to a tank or waste. Accordingly, piston 35 moves leftwardly and clutch 16—17 is engaged, causing alternating current motor 10 to drive shaft 21 at the same speed and in the same direction as direct current motor 24 is driving it so that the rolls 29 and 32 are rotating under the influence of both motors 10 and 24.

The mill is now ready for the forward pass working stroke. Means (not shown and forming no part of this invention) may independently be rendered effective to feed the work to the rolls 29 and 32 to effect the forward pass working operation.

After the forward pass has been completed, lever 61 is moved back to its number I position, which will bring the control arrangement 24A back to its starting position. While lever 61 is still in motion between positions II and I, the speed of motor 24 will be determined by the speed of motor 10 since the clutch 16—17 is engaged. When lever 61 is at its number I position, the cam associated with it may open contact 62, thereby de-energizing solenoid 44 whereupon spring 43 returns valve 42 to the position shown in FIG. 2, which in turn causes valve 39, piston 35 and clutch element 17 to be moved likewise to the positions shown in FIG. 2. The cam means of lever 61 will also open contacts F—F to disconnect motor 24 from the power supply. The motor 24 is now free to decrease its speed, and the resulting difference in speeds of generators 59 and 60 will cause synchronizer 58 to open contacts 57 so that the initial condition thereof will be restored.

When lever 61 passes through the neutral position to its number III position, the cam means associated with the lever may be employed to close contacts R—R so as to set the circuit for operation of motor 24 in the reverse direction. As lever 61 is moved to its position III, means on its associated cam may close contacts 63 which does not energize solenoid 56 since contacts 57 are open, contacts 62 being open likewise.

Continued motion of lever 61 to position IV will adjust the control box 24A which includes conventional dynamic braking and/or plugging means, until the control box is set for the desired operating speed of motor 24 in the reverse direction. Thus, the speed of motor 24 will first be decreased to zero and then increased in the reverse direction to the desired rate upon movement of lever 61 from its position I through neutral and past position III to position IV. When the speed of motor 24 has reached operating speed in the reverse direction, synchronizer 58 closes contacts 57, whereupon solenoid 56 is energized. Energizing solenoid 56 moves valve 54 rightwardly against the action of spring 55, whereupon valve 51 is moved leftwardly, causing piston 47 to move rightwardly thereby effecting engagement of clutch 18—19. Both motors 10 and 24 now contribute to the rotation of the rolls 29 and 32 in the reverse direction and the mill is in condition to produce the rearward working pass when the work is fed to the rolls 29 and 32.

After the rearward working pass has been completed, lever 61 is moved from its position IV to position III, which will bring the control box 24A back to its starting position with the direct current motor 24 being driven by motor 10 as long as the clutch 16—17 remains engaged. When lever 61 is at its number I position, the cam means associated with it may open contact 63, de-energizing solenoid 56 and causing clutch 18—19 to be disengaged. The cam means of lever 61 will also open contacts R—R to disconnect motor 24 from the power supply. The motor 24 is now free to decrease its speed, and the resulting difference in speeds of generators 59, 60 will cause synchronizer 58 to open contacts 57 so that the initial condition thereof will be restored and the mill is ready for the next working cycle.

Although the various features of the new and improved drive for reversing rolling mills and the like have been shown and described in detail to fully disclose one embodiment of the invention, it will be evident that numerous changes may be made in such details, and certain features may be used without others without departing from the principles of the invention. For example, the automatic synchronizer 58 shown may be replaced by any other electrical or mechanical device which will automatically close contacts 57 when each of the motors 10 and 24 rotates at its predetermined operating speed. Further, the sequence of operations occurring during movement of control lever 61 from neutral past position I to positoin II may be changed during return of the lever from position II past position I to neutral. In particular, the contacts 62 may be opened as soon as lever 61 leaves the number II position so that clutch 16—17 is disengaged at this instant and the direct current motor 24 will be braked dynamically by means of the control box 24A at this time. Movement of lever 61 from position IV through position III to neutral will then be arranged to act on contacts 63 in a corresponding manner to effect braking of the direct current motor early during the reverse cycle. Such changed sequence of operations during an upward movement of lever 61, as compared with the sequence during a preceding downward movement, may be obtained by conventional mechanical means, e.g., offset cams, or by conventional electrical control means.

What is claimed is:

1. In a rolling mill having a stand of reversible rolls, the combination including a drive for rotating said rolls at a predetermined speed, said drive comprising a main motor; means for maintaining said motor energized and rotating in one direction throughout an entire rolling cycle including forward and reverse working passes; means for connecting said motor to, and disconnecting it from, said rolls at the beginning and end of each working pass, respectively; means independent of said main motor for stopping and reversing the direction of rotation of said rolls at the end of each working pass while they are idle, and accelerating said idle rolls until said predetermined speed is substantially reached; and means for causing said main motor to supply power to said rolls during each forward and reverse working pass.

2. In a rolling mill, the combination of a stand of reversible rolls; a drive for rotating said rolls at a predetermined speed, said drive comprising an alternating current motor; means for maintaining said motor energized and rotating in one direction throughout an entire rolling cycle including forward and reverse working passes; means for connecting said motor to, and disconnecting it from, said rolls at the beginning and end of each working pass, respectively; auxiliary power means for stopping and reversing the direction of rotation of said rolls at each end of each working pass while they are idle, and accelerating said idle rolls until said predetermined speed is substantially reached; and means for causing said alternating current motor to supply power to said rolls during each forward and reverse working pass.

3. In a rolling mill, the combination of a stand of reversible rolls; a drive for rotating said rolls at a predetermined speed, said drive comprising an alternating current motor; means for maintaining said motor energized and rotating in one direction throughout an entire rolling cycle including forward and reverse working passes; means for connecting said motor to, and disconnecting it from, said rolls at the beginning and end of each working pass, respectively; auxiliary power means for stopping and reversing the direction of rotation of said rolls at each end of each working pass while they are idle, and accelerating said idle rolls until said predetermined speed is substantially reached; and means for causing said alternating current motor and said auxiliary power means to supply power to said rolls during each forward and reverse working pass.

4. In a rolling mill, the combination of a stand of reversible rolls; a drive for rotating said rolls at a predetermined speed, said drive comprising an alternating current motor; means for maintaining said motor energized and rotating in one direction throughout an entire rolling cycle including forward and reverse working passes; means for connecting said motor to, and disconnecting it from, said rolls at the beginning and end of each working pass, respectively; a reversible direct current motor for stopping and reversing the direction of rotation of said rolls at the end of each working pass while they are idle, and accelerating said idle rolls until said predetermined speed is substantially reached; and means for causing said alternating current and direct current motors to supply power to said rolls during each forward and reverse working pass.

5. In a reversing drive, a unidirectional constant speed prime mover; a drive shaft connected to said prime mover; a driven shaft; a gear train between said shafts for rotating said driven shaft in a forward direction; another gear train including an idler gear between said drive and driven shafts for rotating said driven shaft reversely, the gear ratios of both said gear trains being substantially the same, whereby both may simultaneously rotate said driven shaft under certain conditions; a reversible, variable speed prime mover connected to the gear train including said idler gear; and clutches between said gear trains and said drive shaft.

6. In a reversing drive, a unidirectional constant speed prime mover; a drive shaft connected to said prime mover; a driven shaft; a gear train between said shafts for rotating said driven shaft in a forward direction; another gear train including an idler gear between said drive and driven shafts for rotating said driven shaft reversely, the gear ratios of both said gear trains being substantially the same, whereby both may simultaneously rotate said driven shaft under certain conditions; a reversible, variable speed prime mover connected to the gear train including said idler gear; clutches between said gear trains and said drive shaft; and a control for operating said clutches and said reversible, variable speed prime mover in a predetermined order.

7. In a reversing drive, an input shaft; an output shaft; means for driving said input shaft at a constant speed in a single direction; separate engageable and disengageable driving connections between said input and output shafts for, respectively, rotating said output shaft in a forward and reverse direction; and reversible, variable speed means connected to said reverse driving connection.

8. In a reversing drive, an input shaft; an output shaft; means for driving said input shaft at a constant speed in a single direction; separate engageable and disengageable driving connections between said input and output shafts for, respectively, rotating said output shaft in a forward and reverse direction; and reversible, variable speed means of substantially less power than said constant speed means, connected to said reverse driving connection.

9. In a reversing drive, an input shaft; an output shaft; a synchronous alternating current motor for driving said input shaft in a single direction; separate engageable and disengageable driving connections between said input and output shafts for, respectively, rotating said output shaft in a forward and reverse direction; and a reversible, variable speed direct current motor of substantially less power than that of said alternating current motor, connected to said reverse driving connection.

10. In a reversing drive, an input shaft; an output shaft; a synchronous alternating current motor for driving said input shaft in a single direction; engageable and disengageable driving connections between said input and output shafts for, respectively, rotating said output shaft in a forward and reverse direction; a reversible, variable speed direct current motor of substantially less power than that of said alternating current motor, connected to said reverse driving connection; switching means having forward and reverse positions; means for energizing both of said motors and for causing them to rotate at effective synchronous speeds, and in a direction to rotate said output shaft in a forward direction; means responsive to said effective synchronous speeds of said motors for rendering effective said forward driving connection when said switching means is in its forward positions; means for energizing both of said motors and for causing them to rotate at effective synchronous speeds, but in opposite directions; and means responsive to said effective synchronous speeds of said motors for rendering effective said reverse driving connection when said switching means is in its reverse position.

11. In a reversing drive, an input shaft; an output shaft; an alternating current constant speed motor connected to said input shaft; a forward driving gear train between said input and output shafts; clutch means for rendering effective said forward driving train; a reverse drive gear train between said input and output shafts; clutch means for rendering effective said reverse drive gear train; a variable speed direct current motor connected to said reverse drive gear train; a control for said drive comprising means for increasing the speed of said direct current motor to effective synchronism with that of the constant speed alternating current motor, and in a direction so that said output shaft can be rotated by both of said motors; and means responsive to said effectively synchronous speed of said motors to effect engagement of said forward driving clutch means.

12. In a reversing drive, an input shaft; an output shaft; an alternating current constant speed motor connected to said input shaft; a forward driving gear train between said input and output shafts; clutch means for rendering effective said forward driving train; a reverse drive gear train between said input and output shafts; clutch means for rendering effective said reverse drive gear train; a variable speed direct current motor connected to said reverse drive gear train; switching means having forward and reverse positions; control means for said drive comprising means for increasing the speed of said direct current motor to effective synchronism with that of the constant speed alternating current motor and in a direction so that said output shaft can be rotated by both of said motors; means responsive to said effectively synchronous speed of said motors to effect engagement of said forward driving clutch means when said switching means is in its forward position; control means for stopping, reversing and rotating said direct current motor at a speed that is in effective synchronism with that of said alternating current motor, but in an opposite direction; and means responsive to said effectively synchronous speed for effecting engagement of said reverse driving clutch means when said switching means is in its reverse position.

References Cited in the file of this patent
UNITED STATES PATENTS

| | | |
|---|---|---|
| 1,024,298 | Thomson | Apr. 23, 1912 |
| 1,667,718 | Connell | May 1, 1928 |
| 1,844,640 | Cutler et al. | Feb. 9, 1932 |